Figure 1:
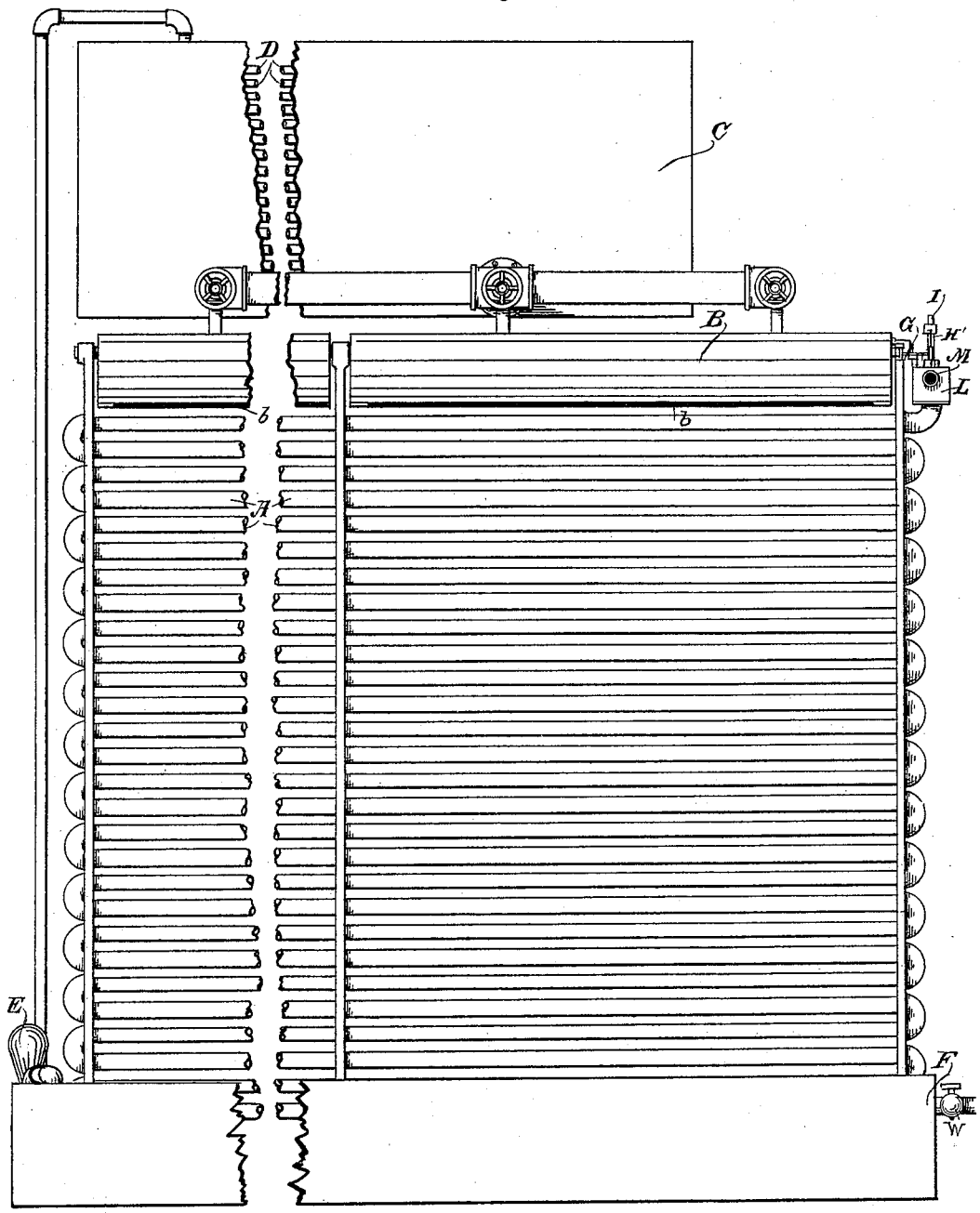

(No Model.) 2 Sheets—Sheet 1.

R. F. SCHROEDER.
PRELIMINARY COOLER FOR ICE MACHINES.

No. 581,431. Patented Apr. 27, 1897.

Witnesses,

Inventor,
Richard F. Schroeder
By Dewey & Co.
Attys

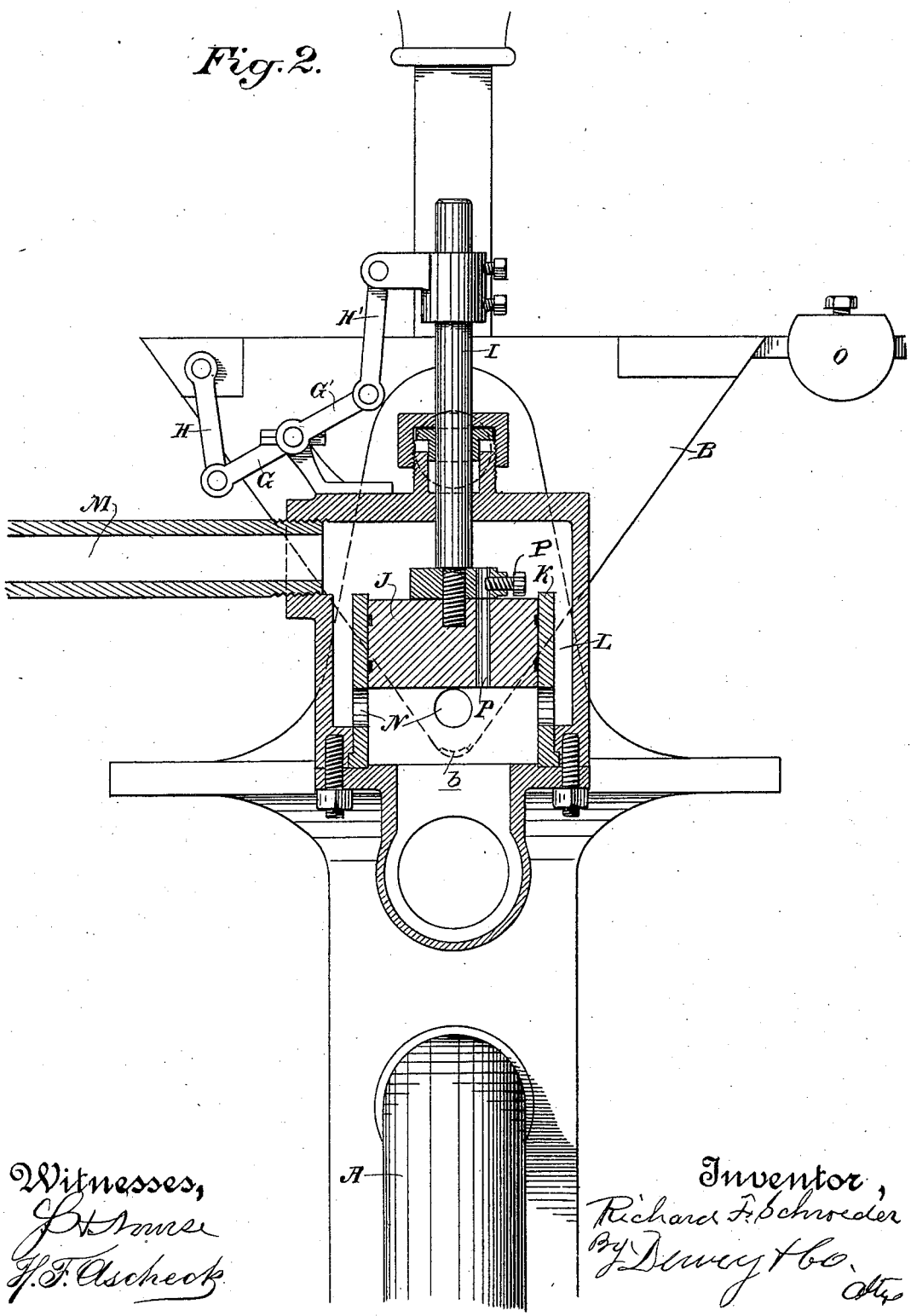

UNITED STATES PATENT OFFICE.

RICHARD F. SCHROEDER, OF SACRAMENTO, CALIFORNIA, ASSIGNOR OF ONE-FOURTH TO CHARLES W. HUTTON, OF SAME PLACE.

PRELIMINARY COOLER FOR ICE-MACHINES.

SPECIFICATION forming part of Letters Patent No. 581,431, dated April 27, 1897.

Application filed July 27, 1896. Serial No. 600,595. (No model.)

*To all whom it may concern:*

Be it known that I, RICHARD F. SCHROEDER, a citizen of the United States, residing at Sacramento, county of Sacramento, State of California, have invented an Improvement in Preliminary Coolers for Ice-Machines; and I hereby declare the following to be a full, clear, and exact description of the same.

My invention relates to an apparatus by which water, after being properly purified, is subjected to a preliminary cooling before being delivered into the cans in which it is finally frozen into blocks.

My invention consists in certain details of construction which will be more fully explained by reference to the accompanying drawings, in which—

Figure 1 is a side elevation of my apparatus. Fig. 2 is an end view of the tilting trough.

In the manufacture of ice it is important to save all the time and labor possible, and for this purpose it is necessary to cool the water in a preliminary apparatus before it is delivered into the final freezing-cans and reduce it to approximately freezing-point, so that the freezing may be more rapidly completed in the cans. This is also conducive to the production of a clearer and more solid ice by reason of the water not being exposed for any great length of time, so as to reabsorb the air which has been previously driven out.

In carrying out my invention various forms of apparatus may be employed.

In the present case I have shown a series of coils of pipe or channels A vertically disposed and suitably supported. Water is admitted into these channels from the purifier, which may be situated sufficiently high so that the water will flow by gravitation. It is here shown entering at the bottom coils and passing backward and forward until it reaches the top, where it is discharged into a pipe leading to the freezing-cans. In conjunction with these coils or channels I employ a suitable means for intermittently discharging cold brine, so that it will trickle down over the channels and cool the water to very near the freezing-temperature while the water is flowing through the channels, the brine being shut off, so that it does not flow over the channels, while the water is stationary within them and during the time when the cans are being changed after one has been filled, it being important to thus cut off the flow of the cold brine to prevent the water being absolutely frozen within the channels. This operation of intermittently discharging the brine upon the channels and cutting it off may be effected by many different forms of apparatus. I prefer to employ an automatically-operating device, one form of which is shown in the present drawings.

Above the coil A, I have shown a tilting V-shaped trough B, journaled at opposite ends and having openings *b* made in the bottom, through which the brine which is contained in the trough is allowed to drip, so as to fall upon the coils and flow down over them when the trough is in a position to bring the openings above the coils, and when the trough is tilted to one side the brine will not flow upon the coils, so that the cooling of the channels will be temporarily arrested.

The supply of the brine for the trough B may be derived from any suitable source. In the present case I have shown a tank C, having the usual ammonia or freezing coils D within it, and the tank is kept filled with brine. This may be done by means of any suitable pump E, which draws the brine from a trough F, into which it is discharged after flowing over the coils A, the pump delivering it again into the tank C, so that there may be a continuous circulation.

In order to automatically operate the trough B, I have shown crank-arms G G', one of which is connected by a link H with the trough at one side of its fulcrum or pivot, and the other crank-arm is connected by a link H' with an adjustable collar upon the upper end of a vertical stem I. This stem has fixed upon its lower end a piston J, movable in a cylindrical sleeve K. This sleeve is fitted into an exterior annular chamber L, into the bottom of which water from the top of the cooling-coil A is introduced by a suitable connecting elbow or passage. From the top of this chamber L a passage M leads to the discharge through which the cooled water is delivered into the ice-can. The sleeve K has holes or passages N made around it, through which the water received from the cooling-coil may flow into the annular passage between it and the sides of the chamber L, and thence into the discharge-passage N.

The piston J fits within the sleeve K, and when it is raised the passages N are opened, so that the water may flow, and when it is pressed down so as to stand across these passages the flow of water through them will cease.

The operation will then be as follows: When a can is in position to be filled, water is admitted into the lower part of the coil A, and, flowing through the coil and up into the chamber L, it forces the piston J up until the passages N are exposed, and the water then flows through the pipe M and into the can, which is filled thereby. The flow continues until the can is filled, and then by the closing of a valve, as at W, it is stopped. While the flow of the water continues the trough B is maintained in such position that the cold brine from it trickles down over the cooling-pipes A and reduces the temperature of the water flowing through them to very nearly freezing-point, so that it is delivered into the cans in that condition.

Whenever a can is filled and the flow of the water through the cooling-pipes temporarily ceases, it is necessary to cut off the supply of brine to prevent the water being absolutely chilled within the pipes, and thus preventing further flow.

The trough B has a weight O adjustably fixed to one side, and as soon as the water ceases flowing through the coil A and passage M this weight acts to tilt the trough B until the discharge-passages in the bottom are carried out of line, when the coils A and the brine will be temporarily diverted, so as not to fall upon the coils. In order to allow this weight to operate, I have shown a small passage P made through the piston J, this passage being sufficient to allow the piston to sink by the action of the weight O, which tilts the trough B, and through the crank-arms G and G' and connecting-links it forces the piston-rod I and the piston J down until the passages N are closed by the piston. As soon as another can is in place to be filled and the water-supply again admitted to flow through the pipes A the pressure will raise the piston J and, acting through the crank-arms G G' upon the trough B, will return it to the position where the discharge-passages will deliver again upon the coil A. In this manner the refrigeration of the water is carried on while it is flowing through the pipes and is temporarily suspended while the cans are being changed.

P' represents a screw-plug controlling the passage P. Its object is to decrease or increase the size of the passage P by screwing it in or out, so that the flow of the liquid through said passage may be regulated and made more or less rapid.

Having thus described my invention, what I claim as new, and desire to secure by Letters Patent, is—

1. In an ice-machine, a preliminary cooler consisting of channels through which the water is conveyed to the can and a device automatically controlled by the flow in the channels for intermittently discharging cold brine thereupon while the can is being filled, and diverting the discharge from the channels while the flow therethrough is arrested.

2. In an ice-machine, a preliminary cooler consisting of channels through which the water flows from the source of supply, and from which it is delivered into the freezing-cans, a trough having openings in the bottom adapted to discharge cold brine upon the channels when in line therewith, a source of supply from which the brine is delivered into the trough, and means whereby the trough may be automatically tilted so as to carry the brine-discharge openings out of line with the channels whenever the flow of water therein is checked.

3. A preliminary cooler for ice-machines consisting of channels interposed between the source of supply and the freezing-can, a pivoted tilting trough having openings in the bottom through which cold brine is discharged, and mechanism automatically controlled by the flow in the channels whereby the trough is alternately tilted so as to discharge the brine upon the channels while water is flowing therethrough, and to divert the flow of brine when the flow of water through the pipes ceases.

4. A preliminary cooler for the water to be frozen in ice-machines, consisting of interposed channels between the water-supply and the freezing-cans, through which the water flows, a pivoted trough having openings in the bottom, said trough being movable so that the openings stand above the channels or are moved to one side thereof, a mechanism for automatically tilting the trough consisting of a weight fixed to one side of the trough, crank-arms and connections with the opposite side, a piston which is raised by such flow of water and a piston-rod with which the crank-arms are connected, and a chamber within which the piston is movable, passages from said chamber which are opened by the flow of water from the channels through the chamber by the movement of the piston, and the openings in the trough are brought in line above the coil, said piston being depressed by the action of the weight when the flow of water ceases, and the trough is tilted so that the discharge is diverted from the conveying-channels.

In witness whereof I have hereunto set my hand.

RICHARD F. SCHROEDER.

Witnesses:
S. H. NOURSE,
JESSIE C. BRODIE.